US011847202B2

(12) United States Patent
Yu

(10) Patent No.: US 11,847,202 B2
(45) Date of Patent: Dec. 19, 2023

(54) CONTROLLING ACCESS TO INPUT DEVICES USING SECURITY PROCESSOR

(71) Applicant: XI'AN ZHONGXING NEW SOFTWARE CO., LTD., Shaanxi (CN)

(72) Inventor: Bing Yu, Guangdong (CN)

(73) Assignee: XI'AN ZHONGXING NEW SOFTWARE CO., LTD., Xi'an (CN)

(*) Notice: Subject to any disclaimer, the term of this patent is extended or adjusted under 35 U.S.C. 154(b) by 336 days.

(21) Appl. No.: 17/282,051

(22) PCT Filed: Oct. 14, 2019

(86) PCT No.: PCT/CN2019/111029
§ 371 (c)(1),
(2) Date: Apr. 1, 2021

(87) PCT Pub. No.: WO2020/078317
PCT Pub. Date: Apr. 23, 2020

(65) Prior Publication Data
US 2021/0342434 A1 Nov. 4, 2021

(30) Foreign Application Priority Data
Oct. 15, 2018 (CN) .......................... 201811195779.1

(51) Int. Cl.
G06F 21/42 (2013.01)
G06F 21/34 (2013.01)
(Continued)

(52) U.S. Cl.
CPC .............. *G06F 21/42* (2013.01); *G06F 21/34* (2013.01); *G06F 21/40* (2013.01); *G06F 21/6245* (2013.01)

(58) Field of Classification Search
CPC .......... G06F 21/70; G06F 21/71; G06F 21/72; G06F 21/34; G06F 21/40; G06F 21/42; G06F 21/6245; G06F 21/81; G06F 21/85
See application file for complete search history.

(56) References Cited

U.S. PATENT DOCUMENTS

2010/0153752 A1* 6/2010 Tsukamoto ............... G06F 1/26
713/300
2013/0222609 A1 8/2013 Soffer
(Continued)

FOREIGN PATENT DOCUMENTS

CN 102055830 A 5/2011

*Primary Examiner* — Theodore C Parsons

(57) ABSTRACT

A mobile terminal (1), a switch control method, and a computer readable storage medium. The mobile terminal (1) comprises a hardware security processor (11), a first information input device (12), and a control switch (14); when the control switch (14) is turned on, if first security information currently collected by the first information input device (12) does not match second security information stored in a storage module, or the second security information does not exist in the storage module when the first security information currently collected by the first information input device (12) is obtained, the hardware security processor (11) controls the control switch (14) to be turned off, so as to prevent a second information input device (15) of the mobile terminal (1) from uploading the collected information to a main processor (16) of the mobile terminal (1).

17 Claims, 4 Drawing Sheets

(51) Int. Cl.
*G06F 21/40* (2013.01)
*G06F 21/62* (2013.01)

(56) References Cited

U.S. PATENT DOCUMENTS

2015/0135021 A1* 5/2015 Robison .............. H04W 12/068
  714/55
2019/0073491 A1* 3/2019 Koyuncu ................ G06F 21/83

* cited by examiner

CONTROLLING ACCESS TO INPUT DEVICES USING SECURITY PROCESSOR

This application claims the priority to the Chinese patent application CN201811195779.1 entitled "Mobile terminal, switch control method, and computer-readable storage medium" filed on Oct. 15, 2018, the entire content of which is incorporated herein by reference.

FIELD OF THE INVENTION

The present disclosure relates to the field of mobile terminals, and in particular to a mobile terminal, a switch control method, and a computer-readable storage medium.

BACKGROUND OF THE INVENTION

In recent years, mobile phones have become more and more intelligent in terms of functions thereof, and more and more applications may involve payment confirmation, personal privacy, useful personal peripheral information, etc. during use thereof. It is therefore of critical importance to protect payment secret keys, personal privacy, and useful peripheral information of mobile phone users.

When a mobile phone is used as an input device, information can be collected via interfaces such as a microphone, a camera, and a sensor. Under normal circumstances, the enabling and disabling of these devices are controlled by a mobile phone user via software. However, the mobile phone, as a part of the Internet of Things, is connected to the network and is thus likely to be under network attacks and implanted with a Trojan virus. In this case, it is possible that these input interfaces for collecting information are maliciously controlled, and then some programs of the CPU is controlled to call device drivers to enable the data collecting devices such as the microphone or the camera, leading to leakage of personal privacy and useful personal peripheral information.

The foregoing content is only intended to assist in the understanding of the technical solutions of the present disclosure, and it does not mean that the foregoing content is recognized as prior art.

SUMMARY OF THE INVENTION

The present disclosure mainly aims to provide a mobile terminal, a switch control method, and a computer-readable storage medium to solve the technical problem of leakage of personal privacy and useful personal peripheral information due to malicious control of an information collection sensor of a mobile terminal.

In order to achieve the above objectives, the present disclosure provides a mobile terminal. The mobile terminal includes: a hardware security processor electrically connected to a power supply of the mobile terminal, a first information input device electrically connected to the hardware security processor, and a control switch electrically connected to the hardware security processor. The hardware security processor is provided with a storage module for storing security information input by the first information input device. When the control switch is in an on state, if first security information currently collected by the first information input device does not match second security information stored in the storage module, or the storage module does not store the second security information when the first security information currently collected by the first information input device is received, the hardware security processor controls the control switch to turn off to prevent a second information input device of the mobile terminal from uploading the collected information to a main processor of the mobile terminal.

In addition, in order to achieve the above objectives, the present disclosure also provides a switch control method, which is applied to any of the above described mobile terminals. The switch control method includes the following steps. When the control switch is in the on state, if first security information collected by the first information input device is received, the hardware security processor determines whether the storage module stores second security information. When the second security information is not stored in the storage module, the control switch is controlled to turn off.

In addition, in order to achieve the above objectives, the present disclosure also provides a computer-readable storage medium storing thereon a switch control program. The switch control program, when executed by a processor, implements steps of the foregoing switch control method.

The realization the objectives, functional characteristics, and advantages of the present disclosure will be further described in conjunction with the embodiments and with reference to the accompanying drawings.

DETAILED DESCRIPTION OF THE EMBODIMENTS

It should be understood that the specific embodiments described herein are only intended to explain, rather than limiting, the present disclosure.

Figure 1:
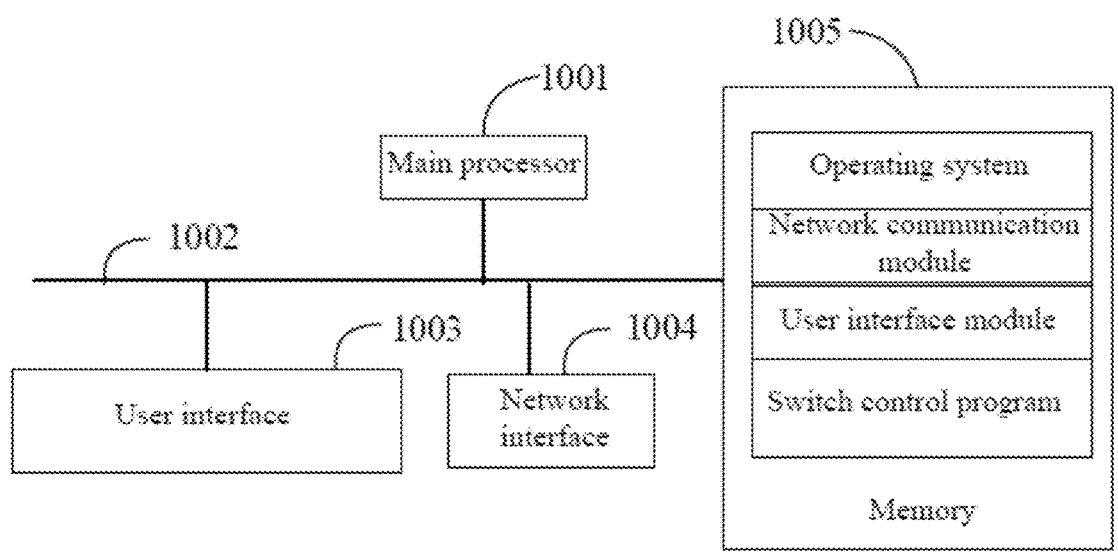
FIG. 1 is a schematic structural diagram of a mobile terminal in a hardware operating environment involved in solutions of embodiments of the present disclosure.

As shown in FIG. 1, FIG. 1 is a schematic structural diagram of a mobile terminal in a hardware operating environment involved in solutions of embodiments of the present disclosure.

In the embodiments of the present disclosure, the mobile terminal may be a portable terminal device with a display function such as a PC, or a smart phone, a tablet computer, an e-book reader, an MP3 (Moving Picture Experts Group Audio Layer III) player, MP4 (Moving Picture Experts Group Audio Layer IV) player, a portable computer, etc.

As shown in FIG. 1, the mobile terminal may include: a main processor 1001 (such as a CPU), a network interface 1004, a user interface 1003, a memory 1005, and a communication bus 1002. The communication bus 1002 is used to realize connection and communication between these components. The user interface 1003 may include a display and an input unit such as a keyboard. In one embodiment, the user interface 1003 may also include a standard wired interface and a wireless interface. The network interface 1004 may include a standard wired interface and a wireless interface (such as a WI-FI interface) in an embodiment. The memory 1005 may be a high-speed random-access memory (RAM), or a non-volatile memory, such as a magnetic disk memory. The memory 1005 may also be a storage device independent of the aforementioned main processor 1001 in an embodiment.

In one embodiment, the mobile terminal may also include a camera, an RF (Radio Frequency) circuit, a sensor, an audio circuit, a WiFi module, etc. The sensor, for example, is a light sensor, a motion sensor, and other sensors. In one embodiment, the light sensor may include an ambient light sensor and a proximity sensor, among which the ambient light sensor may adjust brightness of the display depending on brightness of ambient light, and the proximity sensor may turn off the display when the mobile terminal is moved to the ear and/or backlight. As a kind of motion sensors, a gravity acceleration sensor can detect magnitude of acceleration in various directions (usually three-axis), detect magnitude and direction of gravity when it is stationary, and can be used to applications that identify postures of the mobile terminal (such as horizontal and vertical screen switching, related games, magnetometer posture calibration), vibration recognition related functions (such as pedometers, knocking), etc. Of course, the mobile terminal may also be equipped with other sensors such as a gyroscope, a barometer, a hygrometer, a thermometer, an infrared sensor, etc., which will not be detailed herein.

Those skilled in the art will understand that the structure of the mobile terminal shown in FIG. 1 does not constitute a limitation on the mobile terminal, and the mobile terminal may include more or fewer components than those shown in the figure, or certain components may be combined, or the components may be arranged in a different way.

As shown in FIG. 1, the memory 1005 as a computer storage medium may include an operating system, a network communication module, a user interface module, and a switch control program.

In the mobile terminal shown in FIG. 1, the network interface 1004 is mainly used to connect to a back-end server and communicate with the back-end server; the user interface 1003 is mainly used to connect to a client (user side) and communicate with the client; and the device 1001 may be used to call the switch control program stored in the memory 1005.

In this embodiment, the mobile terminal includes: a hardware security processor, a first information input device, a control switch, a memory 1005, a main processor 1001, and a switch control program stored on the memory 1005 and runnable on the hardware security processor. The hardware security processor is electrically connected to a power supply of the mobile terminal, and may be used to call the switch control program stored in the memory 1005. The first information input device and the control switch are respectively electrically connected to the hardware security processor. The hardware security processor is provided with a storage module for storing security information input by the first information input device.

When the hardware security processor calls the switch control program stored in the memory 1005, it executes steps in each embodiment of the switch control method of the present disclosure.

The present disclosure provides a mobile terminal.

Figure 2:
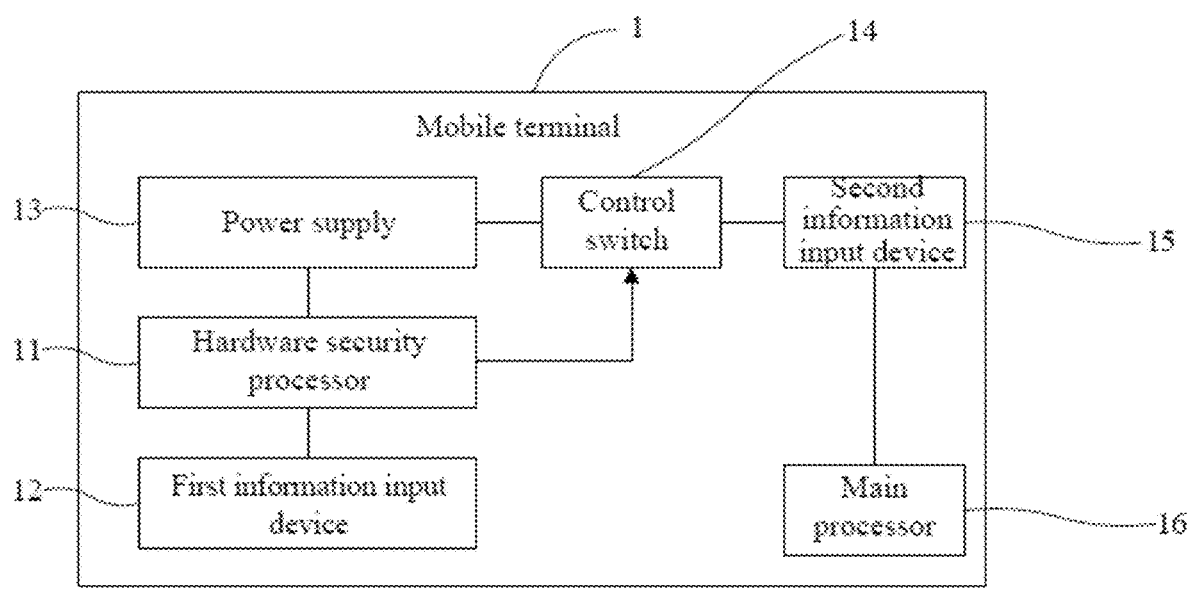
FIG. 2 is a schematic structural diagram of an embodiment of a mobile terminal of the present disclosure.
Figure 3:
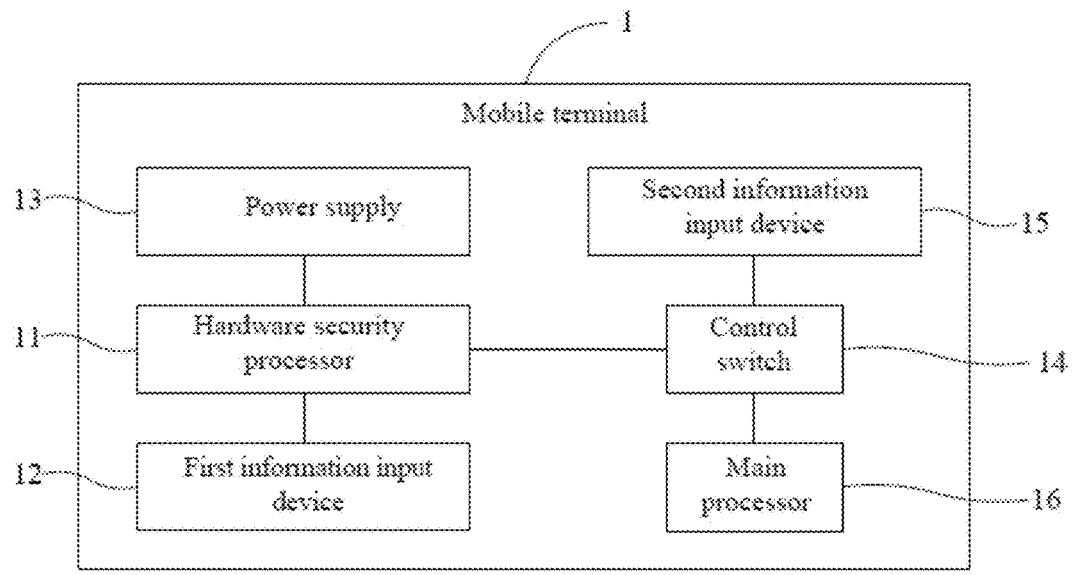
FIG. 3 is a schematic structural diagram of another embodiment of the mobile terminal of the present disclosure.

Referring to FIGS. 2 and 3, FIG. 2 is a schematic structural diagram of an embodiment of the mobile terminal of the present disclosure, and FIG. 3 is a schematic structural diagram of another embodiment of the mobile terminal of the present disclosure.

In the embodiments of the present disclosure, the mobile terminal 1 includes a hardware security processor 11 electrically connected to a power supply 13 of the mobile terminal 1, a first information input device 12 electrically connected to the hardware security processor 11, and a control switch 14 electrically connected to the hardware security processor 11.

The hardware security processor 11 is provided with a storage module for storing security information collected by the first information input device. The storage module includes a first storage unit for storing first security information, and a second storage unit for storing second security information.

The hardware security processor 11 is electrically connected to the power supply 13 of the mobile terminal 1, and is directly powered by the power supply 13 (namely the battery) of the mobile terminal 1. When the hardware security processor is powered on, its feature information input interface is automatically activated and waits for the first information input device 12 to upload collected feature information. The first information input device 12 includes a fingerprint recognition sensor, an iris recognition sensor, a microphone or a camera, etc.

The mobile terminal 1 is also provided with a main processor 16 and a second information input device 15. Feature information collected by the second information input device 15 is used for various functions such as unlocking, awakening, and payment identity verification functions.

In this embodiment, the hardware security processor 11 and the main processor 16 of the mobile terminal are independent of each other. The hardware security processor 11 is only electrically connected to the first information input device 12, the power supply 13, and the control switch 14. The first information input device 12 is only electrically connected to the hardware security processor 11. The control switch 14 may only be controlled by the hardware security processor 11. That is, the control switch 14 may only be controlled to be switched on or off by means of the hardware security processor 11.

In one embodiment, the hardware security processor 11 does not communicate with the main processor 16, and thus cannot be under network attacks or implanted with a Trojan horse; and the control switch 14 is not controlled by the main processor 16. This realizes complete information security and protection. This can not only realize protection of a mobile phone owner's information, but also realizes information protection of an owner of the environment in which the mobile phone is located. The definition of information security is thus comprehensively improved. In one embodiment, referring to FIG. 2, the control switch is provided in a power supply circuit of the second information input device 15 of the mobile terminal, or, referring to FIG. 3, the control switch is provided in a circuit path between the second information input device 15 and the main processor 16 of the mobile terminal.

When the control switch 14 is provided in the power supply circuit of the second information input device 15 of the mobile terminal, the hardware security processor 11 may control the control switch 14 to turn on or off to control a power supply state of the second information input device 15. When the control switch 14 is provided in the circuit path between the second information input device 15 and the main processor 16, the hardware security processor 11 controls the control switch 14 to turn on or off to control a communication state between the second information input device 15 and the main processor 16.

When the control switch 14 is turned on, if the first security information currently collected by the first information input device 12 does not match the second security information stored in the storage module, or the second security information is not stored in the storage module when the first security information currently collected by the first information input device is received, the hardware security processor 11 controls the control switch 14 to turn off to prevent the second information input device 15 of the mobile terminal from uploading the collected information to the main processor 16 of the mobile terminal.

The second information input device 15 includes a fingerprint recognition sensor, an iris recognition sensor, a microphone or a camera, etc.

In this embodiment, in a normal state, the control switch is in an on state, and the user can use various functions of the mobile terminal normally. If the first information input device currently collects the first security information, the hardware security processor stores the first security information. If no other security information is stored in the first storage unit, the first security information is stored into the first storage unit, causing the data stored in the first storage unit and the second storage unit to be inconsistent. At this moment, the hardware security processor controls the control switch to turn off, so that the power supply circuit of the second information input device is disconnected, or the circuit path between the second information input device and the main processor is disconnected, thereby preventing the second information input device of the mobile terminal from uploading the collected information to the main processor of the mobile terminal. Or, if other security information, namely the second security information, is stored in the first storage unit, the first security information is stored into the second storage unit. At this time, if the first security information does not match the second security information, the data stored in the first storage unit and the data stored in the second storage unit are inconsistent. At this moment, the hardware security processor controls the control switch to turn off, so that the power supply circuit of the second information input device is disconnected, or the circuit path between the second information input device and the main processor is disconnected, thereby preventing the second information input device of the mobile terminal from uploading the collected information to the main processor of the mobile terminal.

In one embodiment, when the control switch 14 is turned off, if third security information currently collected by the first information input device 12 matches fourth security information stored in the storage module, the hardware security processor 11 controls the control switch 14 to turn on, so that the second information input device 15 uploads the collected information to the main processor 16.

In this embodiment, when the control switch is in the off state, the second information input device is not able to upload data, and an input function of a feature information sensor of the mobile terminal is disabled. If the first information input device currently collects third security information, the hardware security processor stores the third security information. If other security information, namely the fourth security information, is stored in the first storage unit, the third security information is stored into the second storage unit. At this time, if the third security information matches the fourth security information, the data stored in the first storage unit and the data stored in the second storage unit are consistent, and the hardware security processor controls the control switch to turn on, so that the second information input device uploads the collected information to the main processor and thus various functions of the mobile terminal can be used normally.

In other embodiments, the first information input device and the second information input device are a same information collection sensor. The information collection sensor may only be connected to the main processor or the hardware security processor at the same time, and a selector switch is required so that a path can be switched. For example, the selector switch is provided in a middle frame of the mobile terminal, in which case the user can manually switch a state of the selector switch. The state of the selector switch includes a first switch state and a second switch state. When the selector switch is in the first switch state, the information collection sensor is electrically connected to the hardware security processor, and when the selector switch is in the second switch state, the information collection sensor is electrically connected to the main processor of the mobile terminal.

When the terminal in this embodiment is used at a private space at home, in order to prevent personal voice or portrait information from being stolen and illegally used, the hardware security processor may be used to control the power supply state of the input device (the second information input device) or the connection state of the input device to the main processor so as to disable the input device. In office environments such as a key laboratory and an important conference venue, in order to prevent leakage of important information of the laboratory or venue, an administrator of the laboratory or a person from an organizer of the venue may control, by means of the hardware security processor, the power supply state of the input device (the second information input device) or the connection state of the input device to the main processor so as to disable the input device. When the input device is disabled, the user can still use other functions of the mobile phone. Compared with turning off the mobile phone by the user or having the mobile phone confiscated by others, this can not only achieve the safety purpose, but also minimize the impact on the use's use of the mobile phone or protection and protect the privacy of mobile phone user.

Figure 4:
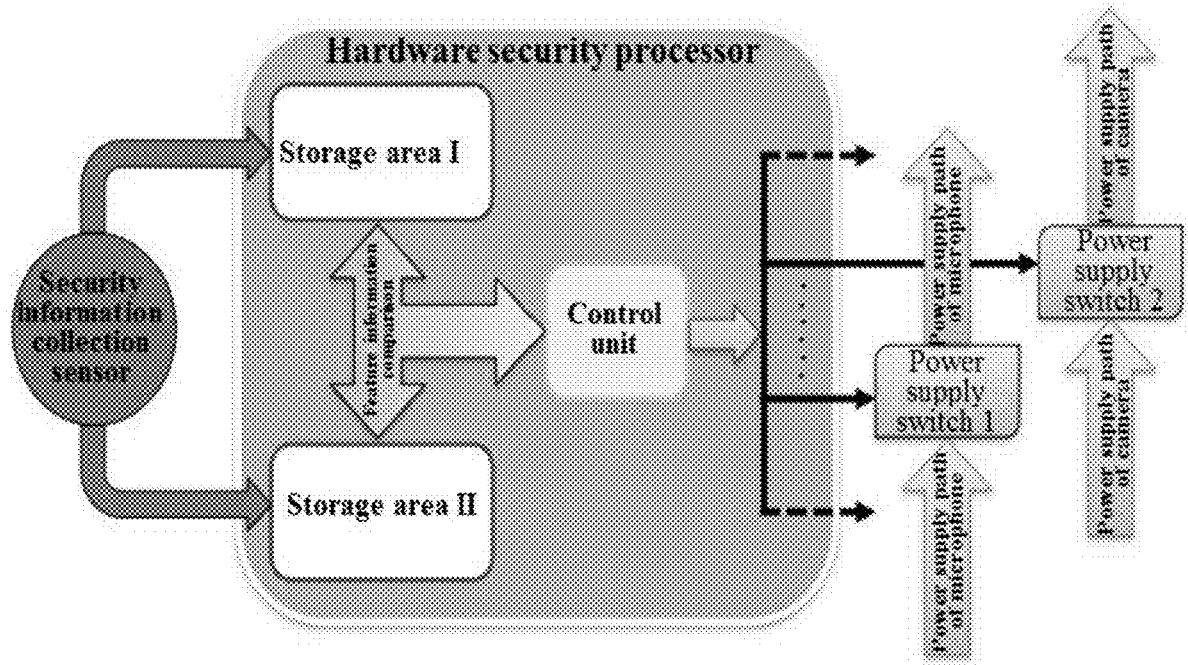
FIG. 4 is a schematic structural diagram of further another embodiment of the mobile terminal of the present disclosure.
Figure 5:
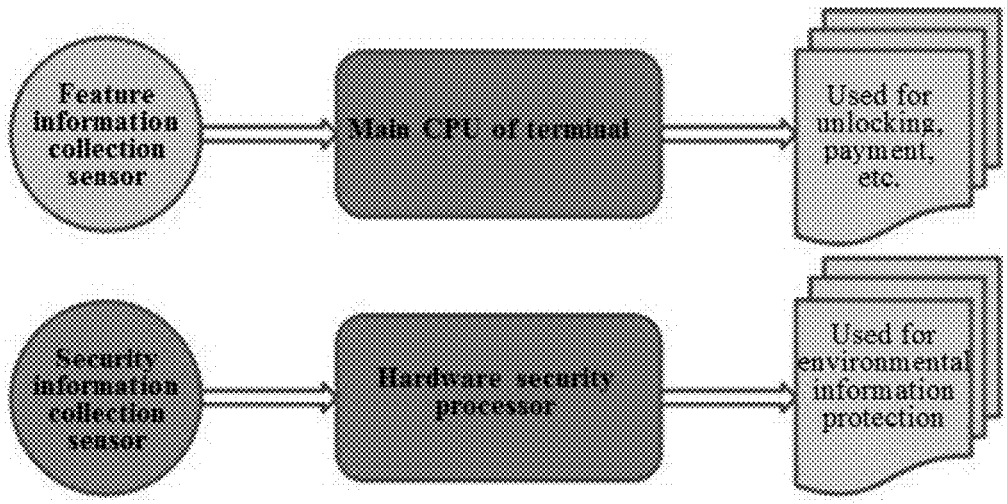
FIG. 5 is a schematic structural diagram of still another embodiment of the mobile terminal of the present disclosure.

Referring to FIGS. 4 and 5, FIG. 4 is a schematic structural diagram of another embodiment of the mobile terminal of the present disclosure, and FIG. 5 is a schematic structural diagram of further another embodiment of the mobile terminal of the present disclosure.

In FIG. 4, the first storage unit is storage area I, and the second storage unit is storage area II. The first information input device is a security information collection sensor, and the first information input device includes a microphone and a camera. The control switch includes a power supply switch 1 and a power supply switch 2. The power supply switch 1 is provided in a power supply path of the microphone, and the power supply switch 2 is provided in a power supply path of the camera. The control unit of the hardware security processor may control power supply to the microphone and the camera by controlling the power supply switch 1 and the power supply switch 2, respectively.

Referring to FIG. 5, the feature information collection sensor (the second information input device) such as the microphone and the camera is in communication connection with a main processor of the mobile terminal (the main CPU of the terminal in FIG. 5), for various functions such as unlocking and awakening of the screen of the mobile terminal, payment, and identity authentication. The security information collection sensor (the first information input device) is only in communication connection with the hardware security processor, for security protection of information stored in the mobile terminal and environmental information in which the mobile terminal is located.

In one embodiment, when the power supply switch 1 and the power supply switch 2 are both turned on, if first security information currently collected by the security information collection sensor does not match second security information stored in the storage area I, or the second security information does not exist in the storage module when the first security information currently collected by the security information collection sensor is received, the control unit of the hardware security processor controls the power supply switch 1 and the power supply switch 2 to turn off to prevent the microphone and the camera from uploading the collected information to the main processor of the mobile terminal. When the control switch is in the off state, if third security information currently collected by the security information collection sensor matches fourth security information stored in the storage module, the hardware safety processor controls the power supply switch 1 and the power supply switch 2 to turn on, so that the microphone and the camera upload the collected information to the main processor.

In the technical solution of the present disclosure, when the control switch is in the on state, if the first security information currently collected by the first information input device does not match the second security information stored in the storage module, or the second security information does not exist in the storage module when the first security information currently collected by the first information input device is received, the hardware security processor controls the control switch to turn off to prevent the second information input device of the mobile terminal from uploading the collected information to the main processor of the mobile terminal. In this way, the hardware security processor does not communicate with the main processor, and thus cannot be under network attacks or implanted with a Trojan virus. Besides, the control switch is not controlled by the main processor, which prevents the second information input device from being maliciously controlled to cause leakage of personal privacy and useful personal peripheral information. This improves security of the mobile terminal and realizes thorough protection of information. This can not only realize protection of a mobile phone owner's information and, but also realizes information protection of an owner of the environment in which the mobile phone is located. The definition of information security is thus comprehensively improved.

Figure 6:
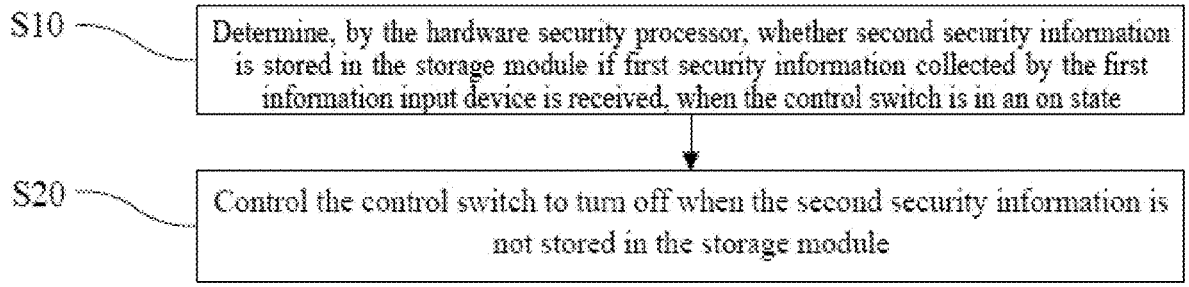
FIG. 6 is a schematic flowchart of a first embodiment of a switch control method of the present disclosure.

The present disclosure also provides a switch control method. Referring to FIG. 6, FIG. 6 is a schematic flowchart of a first embodiment of a switch control method of the present disclosure.

In this embodiment, the switch control method is applied to the mobile terminal in each of the foregoing embodiments. The switch control method includes the following steps. In step S10, when the control switch is in the on state, if first security information collected by the first information input device is received, the hardware security processor determines whether second security information is stored in the storage module. In this embodiment, in the normal state, the control switch is in the on state, and the user can normally use various functions of the mobile terminal. If the first information input device currently collects first security information, the hardware security processor determines whether second security information is stored in the storage module. The second security information is other security information other than the first security information, namely security information collected by the first information input device and stored in the storage module before the current moment.

In step S20, when the second security information is not stored in the storage module, the control switch is controlled to turn off.

In this embodiment, if the second security information is not stored in the storage module, the control switch is controlled to turn off, so that a power supply circuit of the second information input device is disconnected, or a circuit path between the second information input device and the main processor is disconnected, thereby preventing the second information input device of the mobile terminal from uploading the collected information to the main processor of the mobile terminal.

In one embodiment, step S20 includes the following steps. When the second security information is not stored in the storage module, the first security information is stored into the storage module, and the control switch is controlled to turn off.

In this embodiment, when the second security information is not stored in the storage module, the first security information is stored into the storage module. When the storage module includes a first storage unit and a second storage unit, security information is stored neither in the first storage unit nor in the second storage unit. The hardware security processor stores the first security information in the first storage unit of the storage module. At this time, data stored in the first storage unit of the storage module is inconsistent with data stored in the second storage unit, the control switch is thus controlled to turn off, so that a power supply circuit of the second information input device is disconnected, or a circuit path between the second information input device and the main processor is disconnected, thereby preventing the second information input device of the mobile terminal from uploading the collected information to the main processor of the mobile terminal.

In the switch control method provided in this embodiment, when the control switch is in the on state, if the first security information collected by the first information input device is received, it is determined whether the second security information is stored in the storage module; and then when the second security information is not stored in the storage module, the control switch is controlled to turn off. In this way, the control switch is turned off when the storage module does not have the second security information, which prevents the second information input device of the mobile terminal from uploading the collected information to the main processor. The hardware security processor does not communicate with the main processor, and thus cannot be under network attacks or implanted with a Trojan virus. Besides, the control switch is not controlled by the main processor, which prevents the second information input device from being maliciously controlled to cause leakage of personal privacy and useful personal peripheral information. This realizes thorough protection of information, and improves the security of the mobile terminal. This can not only realize protection of a mobile phone owner's information and, but also realizes information protection of an owner of the environment in which the mobile phone is located. The definition of information security is thus comprehensively improved.

Figure 7:
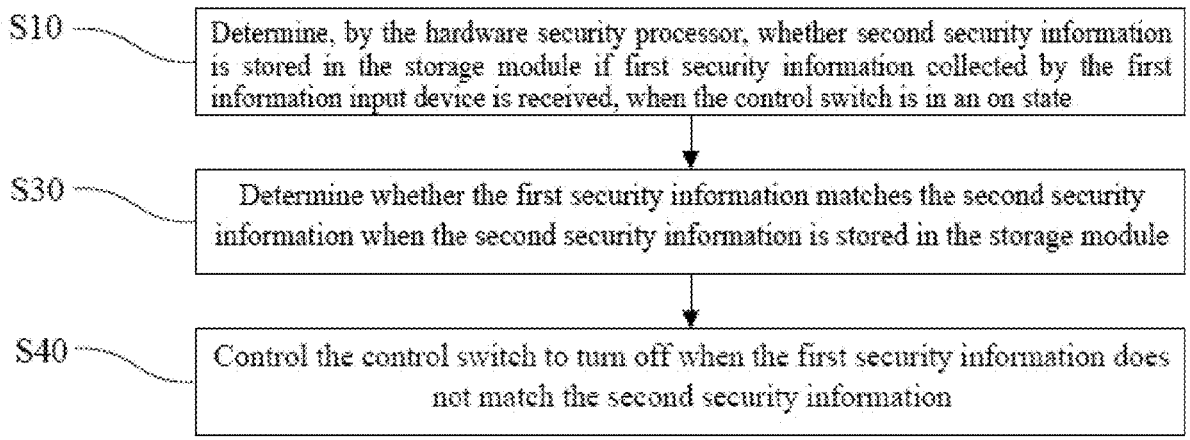
FIG. 7 is a schematic flowchart of a second embodiment of the switch control method of the present disclosure.

Based on the first embodiment, a second embodiment of the switch control method of the present disclosure is provided. Referring to FIG. 7, in this embodiment, after step S10, the switch control method further includes the following steps. In step S30, when the second security information is stored in the storage module, it is determined whether the first security information matches the second security information. In step S40, when the first security information does not match the second security information, the control switch is controlled to turn off.

In this embodiment, if the second security information is stored in the storage module, it is determined whether the first security information matches the second security information. If the first security information does not match the second security information, the control switch is controlled to turn off, so that the power supply circuit of the second information input the device is disconnected, or the circuit path between the second information input device between the main processor is disconnected, thereby preventing the second information input device of the mobile terminal from uploading the collected information to the main processor of the mobile terminal.

If the first security information is fingerprint information, to determine whether the first security information matches the second security information is to determine whether the first security information and the second security information are a fingerprint of a same finger of a same user. If the security information is image information, to determine whether the first security information matches the second security information is to determine through face recognition whether the first security information and the second security information are an image of a same user. If the first security information is iris information, to determine whether the first security information matches the second security information is to determine through iris recognition whether the first security information and the second security information are an iris of a same user.

In one embodiment, step S30 includes the following steps. When the second security information is stored in the storage module, the first security information is stored into the storage module, and it is determined whether the first security information matches the second security information.

Step S40 includes the following steps. When the first security information does not match the second security information, the control switch is controlled to turn off, and the first security information stored in the storage module is deleted.

In this embodiment, if the second security information is stored in the storage module, the first security information is stored into the storage module. If the storage module includes a first storage unit and a second storage unit, the second security information is stored at this time into the first storage unit, and the first security information is stored into the second storage unit. It is then determined whether the first security information matches the second security information, that is, whether the data in the first storage unit matches the data in the second storage unit. If the first security information does not match the second security information, the control switch is controlled to turn off, so that the power supply circuit of the second information input device is disconnected, or the circuit path between the second information input device and the main processor is disconnected, thereby preventing the second information input device of the terminal from uploading the collected information to the main processor of the mobile terminal, and then the first security information stored in the storage module is deleted. If the first security information matches the second security information, the current on state of the control switch is maintained, and the first security information stored in the second storage unit is deleted.

In the switch control method provided in this embodiment, when the second security information is stored in the storage module, it is determined whether the first security information matches the second security information; then when the first security information does not match the second security information, the control switch is controlled to turn off. By reasonably disconnecting the control switch based on the first security information and the second security information, the second security information of the mobile terminal is prevented from uploading the collected information to the main processor when the security information does not match. The hardware security processor does not communicate with the main processor, and thus cannot be under network attacks or implanted with a Trojan virus. Besides, the control switch is not controlled by the main processor, which prevents the second information input device from being maliciously controlled to cause leakage of personal privacy and useful personal peripheral information. This realizes thorough protection of information and improves security of the mobile terminal.

Figure 8:
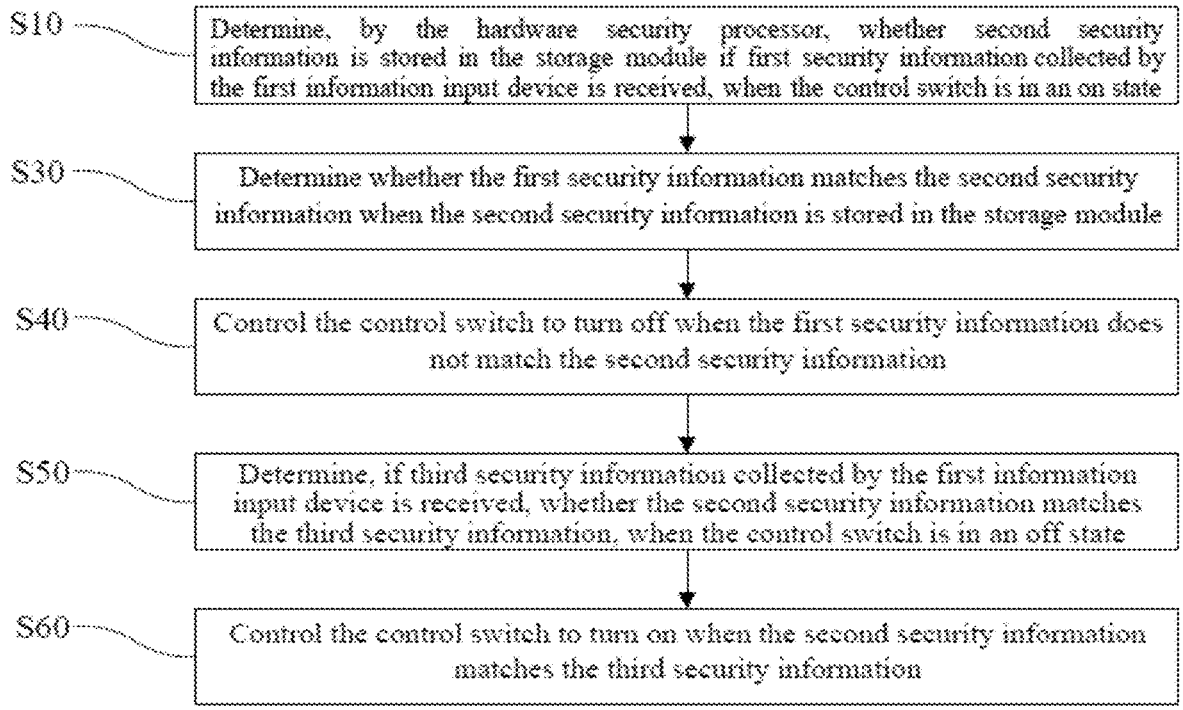
FIG. 8 is a schematic flowchart of a third embodiment of the switch control method of the present disclosure.

Based on the second embodiment, a third embodiment of the switch control method of the present disclosure is provided. Referring to FIG. 8, in this embodiment, after step S40, the switch control method further includes the following steps. In step S50, when the control switch is in the off state, if the third security information collected by the first information input device is received, it is determined whether the second security information matches the third security information. In step S60, if the second security information matches the third security information, the control switch is controlled to turn on.

In this embodiment, when the control switch is in the off state, the second information input device is not able to upload data, and an input function of a feature information sensor of the mobile terminal is disabled. If the first information input device currently collects third security information, the hardware security processor determines whether the second security information matches the third security information. If the second security information matches the third security information, the hardware security processor controls the control switch to turn on, so that the second information input device uploads the collected information to the main processor and various functions of the mobile terminal can be used normally.

In one embodiment, when the control switch is in the off state, if the first information input device currently collects third security information, the hardware security processor stores the third security information. If the storage module includes a first storage unit and a second storage unit, the second security information is stored into the first storage unit, and the third security information is stored into the second storage unit, and it is determined whether the second security information matches the third security information, that is, whether the data in the first storage unit matches the data in the second storage unit. If the second security information matches the third security information, the hardware security processor controls the control switch to turn on, so that the second information input device uploads the collected information to the main processor and various functions of the mobile terminal can be used normally, and the second security information and the third security information stored in the storage module are deleted. It should be noted that if the second security information does not match the third security information, the control switch is maintained in the off state, and the third security information stored in the storage module is deleted.

In the switch control method provided in this embodiment, when the control switch is in the off state, if the third security information collected by the first information input device is received, it is determined whether the second security information matches the third security information; and then when the second security information matches the third security information, the control switch is controlled to turn on. The control switch can be controlled to turn on based on the third security information, so that the user can use the mobile terminal normally, which improves user experience. The control switch is turned on only when the third security information matches the second security information, which further improves the security of the mobile terminal.

Figure 9:
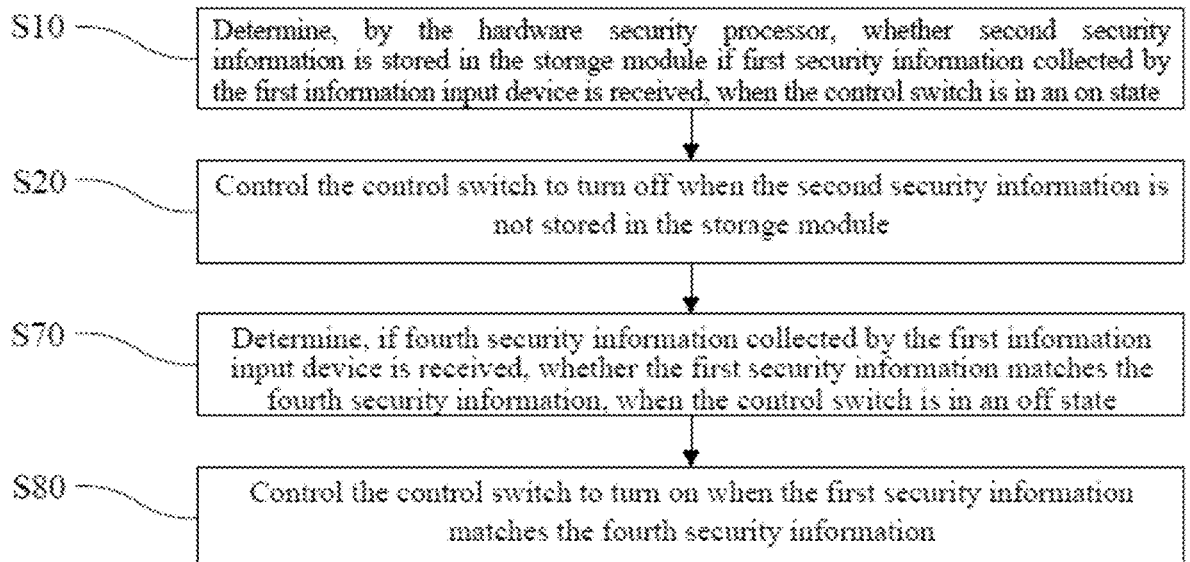
FIG. 9 is a schematic flowchart of a fourth embodiment of the switch control method of the present disclosure.

Based on the first embodiment, a fourth embodiment of the switch control method of the present disclosure is provided. Referring to FIG. 9, in this embodiment, after step S20, the switch control method further includes the following steps. In step S70, when the control switch is in the off state, if fourth security information collected by the first information input device is received, it is determined whether the first security information matches the fourth security information. In step S80, when the first security information matches the fourth security information, the control switch is controlled to turn on.

In this embodiment, when the control switch is in the off state, the second information input device is not able to upload data, and an input function of the feature information sensor of the mobile terminal is disabled. If the first information input device currently collects the fourth security information, the hardware security processor determines whether the first security information matches the fourth security information. If the first security information matches the fourth security information, the hardware security processor controls the control switch to turn on, so that the second information input device uploads the collected information to the main processor and various functions of the mobile terminal can be used normally.

In one embodiment, step S70 includes the following steps. When the fourth security information collected by the first information input device is received, the fourth security information is stored into the storage module, and it is determined whether the first security information matches the fourth security information. Step S80 includes the following steps. When the first security information matches the fourth security information, the control switch is controlled to turn on, and the first security information and the fourth security information stored in the storage module are deleted.

In this embodiment, when the control switch is in the off state, if the first information input device currently collects the fourth security information, the hardware security processor stores the fourth security information. If the storage module includes a first storage unit and a second storage unit, the first security information is stored into the first storage unit, and the fourth security information is stored into the second storage unit. It is then determined whether the first security information matches the fourth security information, that is, whether the data in the first storage unit matches the data in the second storage unit. If the first security information matches the fourth security information, the hardware security processor controls the control switch to turn on, so that the second information input device upload the collected data to the main processor and various functions of the mobile terminal can be used normally. It should be noted that if the first security information does not match the fourth security information, the control switch is maintained in the off state, and the fourth security information stored in the storage module is deleted.

In the switch control method provided in this embodiment, when the control switch is in the off state, if the fourth security information collected by the first information input device is received, it is determined whether the first security information matches the fourth security information; and then when the first security information matches the fourth security information, the control switch is controlled to turn on. The control switch can be controlled to turn on based on the fourth security information, so that the user can use the mobile terminal normally, which improves user experience. The control switch is turned on only when the fourth security information matches the first security information, which further improves the security of the mobile terminal.

In addition, the embodiments of the present disclosure also provide a computer-readable storage medium. The computer-readable storage medium stores thereon a switch control program. The switch control program, when executed by a processor, implements steps of each of the embodiments of the switch control method of the present disclosure.

It should be noted that in this text, the terms "include", "comprise" or any other variants thereof are intended to cover non-exclusive inclusion, so that a process, a method, an article or a system including a series of elements not only includes those listed elements, but also includes other elements that are not explicitly listed, or elements inherent to the process, the method, the article, or the system. Without more restrictions, an element defined by the sentence "comprising a . . . " does not exclude the existence of other identical elements in the process, the method, the article, or the system that includes the element.

The sequence numbers of the above-mentioned embodiments of the present disclosure are only for description, and do not represent superiority of an embodiment over other embodiments.

Through the description of the above embodiments, those skilled in the art can be well aware that the methods of the above embodiments can be implemented by means of software plus necessary general hardware platforms, and of course by means of hardware, but in many cases preferably by means of the former. Based on such an understanding, the technical solutions of the present disclosure in their essence or the part thereof that contributes to the prior art can be embodied in the form of a software product. The computer software product is stored in a storage medium (such as a ROM/RAM, a magnetic disk, an optical disk) as described above, and includes a plurality of instructions to enable a terminal device (which can be a mobile phone, a computer, a server, an air conditioner, or a network device, etc.) to implement the methods described in the various embodiments of the present disclosure.

In the present disclosure, when the control switch is in the on state, if the first security information currently collected by the first information input device does not match the second security information stored in the storage module, or the second security information is not stored in the storage module when the first security information currently collected by the first information input device is received, the hardware security processor controls the control switch to turn off to prevent the second information input device of the mobile terminal from uploading the collected information to the main processor of the mobile terminal. In this way, the hardware security processor does not communicate with the main processor, and thus cannot be under network attacks or implanted with a Trojan virus. Besides, the control switch is not controlled by the main processor, which prevents the second information input device from being maliciously controlled to cause leakage of personal privacy and useful personal peripheral information. This improves security of the mobile terminal and realizes thorough protection of information. This can not only realize protection of a mobile phone owner's information and, but also realizes information protection of an owner of the environment in which the mobile phone is located. The definition of information security is thus comprehensively improved.

The hardware security processor of the present disclosure does not communicate with the main processor, which prevents the second information input device of the mobile terminal from being maliciously controlled to cause leakage of personal privacy and useful personal peripheral information. The security of the mobile terminal is thus improved.

The above are only some embodiments of the present disclosure, and do not limit the scope of the present disclosure. Any equivalent structure or equivalent process variations made based on the disclosure of the description and drawings of the present disclosure, or directly or indirectly applied to other related technical fields, should all be included in the protection scope of the present disclosure.

The invention claimed is:

1. A mobile terminal, comprising: a hardware security processor electrically connected to a power supply of the mobile terminal, a first information input device electrically connected to the hardware security processor, and a control switch electrically connected to the hardware security processor, wherein
the hardware security processor is provided with a storage module for storing security information input by the first information input device, and
when the control switch is in an on state, if first security information currently collected by the first information input device does not match second security information stored in the storage module, or the second security information is not stored in the storage module when the first security information currently collected by the first information input device is received, the hardware security processor controls the control switch to turn off, so that a second information input device of the mobile terminal is prevented from uploading collected information to a main processor of the mobile terminal,
wherein the hardware security processor does not communicate with the main processor, and the control switch is not controlled by the main processor, the first security information is security information collected currently by the first information input device when the control switch is in the on state, and the second security information is security information collected by the first information input device and stored in the storage module before a current moment when the control switch is in the on state.

2. The mobile terminal according to claim 1, wherein the storage module comprises a first storage unit for storing the first security information, and a second storage unit for storing the second security information; and when the control switch is in an off state, if third security information currently collected by the first information input device matches fourth security information stored in the storage module, the hardware security processor controls the control switch to turn on to allow the second information input device to upload the collected information to the main processor,
wherein the third security information is security information collected currently by the first information input device upon the condition that the control switch is in the off state and the first security information does not match with the second security information, and the fourth security information is security information collected by the first information input device upon the condition that the control switch is in the off state and the second security information is not stored in the storage module.

3. The mobile terminal according to claim 2, wherein the control switch is provided in a power supply circuit of the second information input device of the mobile terminal, or the control switch is provided in a circuit path between the second information input device and the main processor of the mobile terminal.

4. A switch control method applied to the mobile terminal, which is comprising: a hardware security processor electrically connected to a power supply of the mobile terminal, a first information input device electrically connected to the hardware security processor, and a control switch electrically connected to the hardware security processor, wherein the hardware security processor is provided with a storage module for storing security information input by the first information input device,
wherein the hardware security processor does not communicate with the main processor, and the control switch is not controlled by the main processor, the first security information is security information collected currently by the first information input device when the control switch is in the on state, and the second security information is security information collected by the first information input device and stored in the storage module before a current moment when the control switch is in the on state;
wherein the switch control method comprises the following steps:
determining, by the hardware security processor, whether second security information is stored in the storage module when first security information collected by the first information input device is received, when the control switch is in an on state, and
controlling, by the hardware security processor, the control switch to turn off when the second security information is not stored in the storage module.

5. The switch control method according to claim 4, wherein after the step of determining whether the second security information other than the first security information is stored in the storage module, the switch control method further comprises:
determining whether the first security information matches the second security information when the second security information is stored in the storage module; and
controlling the control switch to turn off when the first security information does not match the second security information.

6. The switch control method according to claim 5, wherein after the step of controlling the control switch to turn off when the first security information does not match the second security information, the switch control method further comprises:
  determining, if third security information collected by the first information input device is received, whether the second security information matches the third security information, when the control switch is in an off state; and
  controlling the control switch to turn on when the second security information matches the third security information,
  wherein the third security information is security information collected currently by the first information input device upon the condition that the control switch is in the off state and the first security information does not match with the second security information.

7. The switch control method according to claim 4, wherein the step of controlling the control switch to turn off when the second security information is not stored in the storage module comprises:
  storing the first security information into the storage module when the second security information is not stored in the storage module, and controlling the control switch to turn off.

8. The switch control method according to claim 7, wherein after the step of storing the first security information into the storage module, the switch control method further comprises:
  determining, if fourth security information collected by the first information input device is received, whether the first security information matches the fourth security information, when the control switch is in an off state;
  controlling the control switch to turn on when the first security information matches the fourth security information,
  wherein the fourth security information is security information collected by the first information input device upon the condition that the control switch is in the off state and the second security information is not stored in the storage module.

9. The switch control method according to claim 8, wherein the step of determining, if the fourth security information collected by the first information input device is received, whether the first security information matches the fourth security information comprises:
  storing the fourth security information into the storage module when the fourth security information collected by the first information input device is received, and determining whether the first security information matches the fourth security information;
  the step of controlling the control switch to turn on when the first security information matches the fourth security information comprises:
  controlling the control switch to turn on when the first security information matches the fourth security information, and deleting the first security information and the fourth security information stored in the storage module.

10. The switch control method according to claim 4, wherein the switch control method further comprises the following steps:
  when the control switch is in an off state, if third security information currently collected by the first information input device matches fourth security information stored in the storage module, the hardware security processor controls the control switch to turn on to allow the second information input device to upload the collected information to the main processor,
  wherein the third security information is security information collected currently by the first information input device upon the condition that the control switch is in the off state and the first security information does not match with the second security information, and the fourth security information is security information collected by the first information input device upon the condition that the control switch is in the off state and the second security information is not stored in the storage module.

11. A non-transitory computer-readable storage medium storing thereon a switch control program, wherein the switch control program, when executed by a processor, implement steps of the switch control method applied to the mobile terminal, which is comprising: a hardware security processor electrically connected to a power supply of the mobile terminal, a first information input device electrically connected to the hardware security processor, and a control switch electrically connected to the hardware security processor, wherein the hardware security processor is provided with a storage module for storing security information input by the first information input device, wherein the hardware security processor does not communicate with the main processor, and the control switch is not controlled by the main processor, the first security information is security information collected currently by the first information input device when the control switch is in the on state, and the second security information is security information collected by the first information input device and stored in the storage module before a current moment when the control switch is in the on state;
  wherein the switch control method comprises the following steps:
  determining, by the hardware security processor, whether second security information is stored in the storage module when first security information collected by the first information input device is received, when the control switch is in an on state, and
  controlling, by the hardware security processor, the control switch to turn off when the second security information is not stored in the storage module.

12. The non-transitory computer-readable storage medium according to claim 11, wherein after the step of determining whether the second security information other than the first security information is stored in the storage module, the switch control method further comprises:
  determining whether the first security information matches the second security information when the second security information is stored in the storage module; and
  controlling the control switch to turn off when the first security information does not match the second security information.

13. The non-transitory computer-readable storage medium according to claim 12, wherein after the step of controlling the control switch to turn off when the first security information does not match the second security information, the switch control method further comprises:
  determining, if third security information collected by the first information input device is received, whether the second security information matches the third security information, when the control switch is in an off state; and controlling the control switch to turn on when the second security information matches the third security information, wherein the third security information is security information collected currently by the first information input device upon the condition that the control switch is in the off state and the first security information does not match with the second security information.

14. The non-transitory computer-readable storage medium according to claim 11, wherein the step of controlling the control switch to turn off when the second security information is not stored in the storage module comprises:

storing the first security information into the storage module when the second security information is not stored in the storage module, and controlling the control switch to turn off.

15. The non-transitory computer-readable storage medium according to claim 14, wherein after the step of storing the first security information into the storage module, the switch control method further comprises:

determining, if fourth security information collected by the first information input device is received, whether the first security information matches the fourth security information, when the control switch is in an off state;

controlling the control switch to turn on when the first security information matches the fourth security information, wherein the fourth security information is security information collected by the first information input device upon the condition that the control switch is in the off state and the second security information is not stored in the storage module.

16. The non-transitory computer-readable storage medium according to claim 15, wherein the step of determining, if the fourth security information collected by the first information input device is received, whether the first security information matches the fourth security information comprises:

storing the fourth security information into the storage module when the fourth security information collected by the first information input device is received, and determining whether the first security information matches the fourth security information;

the step of controlling the control switch to turn on when the first security information matches the fourth security information comprises:

controlling the control switch to turn on when the first security information matches the fourth security information, and deleting the first security information and the fourth security information stored in the storage module.

17. The non-transitory computer-readable storage medium according to claim 11, wherein the switch control method further comprises the following steps:

when the control switch is in an off state, if third security information currently collected by the first information input device matches fourth security information stored in the storage module, the hardware security processor controls the control switch to turn on to allow the second information input device to upload the collected information to the main processor, wherein the third security information is security information collected currently by the first information input device upon the condition that the control switch is in the off state and the first security information does not match with the second security information, and the fourth security information is security information collected by the first information input device upon the condition that the control switch is in the off state and the second security information is not stored in the storage module.

* * * * *